(12) United States Patent
Robertson et al.

(10) Patent No.: US 8,229,735 B2
(45) Date of Patent: Jul. 24, 2012

(54) GRAMMAR CHECKER FOR VISUALIZATION

(75) Inventors: George G. Robertson, Seattle, WA (US); Brian Scott Ruble, Redmond, WA (US); William G. Morein, Cambridge, MA (US); Sean Michael Boon, Snoqualmie, WA (US); Nathan Paul McCoy, Woodinville, WA (US); Jakob Peter Nielsen, Redmond, WA (US); Michael Ehrenberg, Seattle, WA (US); Joshua Wyndham Lee, Englewood, NJ (US); Jason Joseph Weber, Burlington, IA (US); Murali R. Krishnan, Kirkland, WA (US); Stella Yick Chan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 654 days.

(21) Appl. No.: 12/147,890

(22) Filed: Jun. 27, 2008

(65) Prior Publication Data

US 2009/0326921 A1 Dec. 31, 2009

(51) Int. Cl.
*G06F 17/27* (2006.01)
(52) U.S. Cl. ............... 704/9; 704/275; 704/272
(58) Field of Classification Search .......... 704/1–10, 704/257, 235, 275, 231, 272; 715/236
See application file for complete search history.

(56) References Cited

U.S. PATENT DOCUMENTS

| | | | |
|---|---|---|---|
| 5,099,425 A | 3/1992 | Yuji et al. | |
| 5,677,835 A | 10/1997 | Carbonell et al. | |
| 5,678,053 A | 10/1997 | Anderson | |
| 5,694,603 A | 12/1997 | Reiffin | |
| 5,940,847 A * | 8/1999 | Fein et al. ............... | 715/236 |
| 6,012,075 A | 1/2000 | Fein et al. | |
| 6,085,237 A | 7/2000 | Durham et al. | |
| 7,117,430 B2 | 10/2006 | Maguire, III et al. | |
| 7,315,818 B2 * | 1/2008 | Stevens et al. ............... | 704/235 |
| 7,324,947 B2 * | 1/2008 | Jordan et al. ............... | 704/275 |
| 2006/0064446 A1 | 3/2006 | Chien et al. | |
| 2006/0230352 A1 | 10/2006 | Nielsen | |
| 2008/0010597 A1 | 1/2008 | Seemann et al. | |

OTHER PUBLICATIONS

Appan et al, "Interactive Visualization and Content Analysis of Instant Messaging Networks", Dec. 2004, In Arts Media and Engineering Program, ADU, AME-TR-2004-14, 4 pgs.
"Checking Grammar", retrieved Apr. 24, 2008 from http://ec.hku.hk/writing_turbocharger/proofing/grammarc.htm, 9 pgs.
"Error Messages", msdn, Microsoft 2008, retrieved Apr. 24, 2008 from http://msdn2.microsoft.com/en-us/library/aa511267(printer).aspx, 29 pgs.

* cited by examiner

*Primary Examiner* — Huyen X. Vo
(74) *Attorney, Agent, or Firm* — Lee & Hayes, PLLC

(57) ABSTRACT

A visualization development system is provided. The system includes a visualization tool to develop one or more visualizations and a grammar engine that operates with the visualization tool to automatically detect visualization problems during the development of the visualizations.

20 Claims, 10 Drawing Sheets

GRAMMAR CHECKER FOR VISUALIZATION

BACKGROUND

Data visualization includes the use of interactive, sensory representations, typically visual, of abstract data to reinforce cognition, hypothesis building, and reasoning. Such visualization can take on many forms including information visualization and knowledge visualization, for example. Related concepts include visual communications, and visual analytics along with aspects such as education and product visualization. In all these visualization areas, tools are provided to help designers generate a desired visualization. Before proceeding, a brief description of the relative areas is provided before a discussion on available tools to support visualization designs.

Information visualization concentrates on the use of computer-supported tools to explore large amounts of abstract data. Practical application of information visualization in computer programs involves selecting, transforming and representing abstract data in a form that facilitates human interaction for exploration and understanding. Some aspects of information visualization are the interactivity and dynamics of visual representation, where strong techniques enable the user to modify the visualization in real-time, thus affording unparalleled perception of patterns and structural relations in the abstract data in question.

Knowledge visualization includes the use of visual representations to transfer knowledge between at least two people and its goals are to improve the transfer of knowledge by using computer and non-computer based visualization methods in a complimentary manner. Examples of such visual formats are sketches, diagrams, images, objects, interactive visualizations, information visualization applications and imaginary visualizations as in stories. While information visualization concentrates on the use of computer-supported tools to derive new insights, knowledge visualization focuses on transferring insights and creating new knowledge in groups. Beyond the mere transfer of facts, knowledge visualization desires to further transfer insights, experiences, attitudes, values, expectations, perspectives, opinions, and predictions by using various complementary visualizations.

Visual communication is the communication of ideas through the visual display of information. Primarily associated with two dimensional images, it includes: alphanumeric components, art, signs, and electronic resources, for example. Recent research in the field has focused on web design and graphically oriented usability. A related term, visual analytics, focuses on human interaction with visualization systems as part of a larger process of data analysis. Visual analytics has been defined as the science of analytical reasoning supported by the interactive visual interface. Its focus is on human information discourse (interaction) within large, dynamically changing information spaces. Visual analytics research concentrates on support for perceptual and cognitive operations that enable users to detect the expected and discover the unexpected in complex information space. Technologies resulting from visual analytics find their application in almost all fields, but are being driven by critical needs (and funding) in biology and national security.

Educational visualization is using a simulation normally created on a computer to create an image of something so it can be taught about. This is useful when teaching about a topic which is difficult to otherwise see, for example, atomic structure, since atoms are far too small to be studied easily without expensive and difficult to use scientific equipment. It can also be used to view past events, such as viewing dinosaurs, or looking at items that are difficult or fragile to observe in reality like the human skeleton, without causing physical or mental harm to a subjective volunteer or cadaver.

Product Visualization involves visualization software technology for the viewing and manipulation of 3D models, technical drawing and other related documentation of manufactured components or large assemblies of products. It is a key part of Product Lifecycle Management. Product visualization software typically provides high levels of simulated realism so that a product can be viewed before it is actually manufactured. This supports functions ranging from design and styling to sales and marketing. Technical visualization is an important aspect of product development. With all these visualization techniques and others, development tools are provided to enable users to design desired visualizations. Although enhancements such as static help files have been embedded within such tools to aid a respective designer with questions when operating the tools, dynamic processes such as real-time checking of visualizations and related development processes is lacking in existing tools.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

A visualization grammar system is provided that checks visualization development in real time and provides feedback to designers to enable accurate and efficient development of visualizations. A grammar engine is provided that operates in conjunction with a visualization development tool. Such tool can be applied to substantially any area of visualization development including scientific visualizations, technical visualizations, information visualizations, knowledge visualizations, education visualizations, product visualizations, along with visual communications, and visual analytics, for example. The grammar engine operates in the background as respective visualizations are being developed. Intelligent processes can interact with the designer to make suggestions for enhancements to the visualizations.

In another aspect, the grammar engine acts as a grammar checker for visualizations where potential defects in a visualization design are called to the attention of the designer. For example, it might be pointed out in a feedback window that an axis laid-out for a particular visualization has potentially promoted a conflict in another area of the visualization. Grammar can include checking the structure and form of visualization commands as well as checking or analyzing the actual output of the visualization for potential errors or warnings. Feedback including grammar checking and automated suggestions can be generated in a separate process output from the visualization or can be integrated with the visualization itself.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent

DETAILED DESCRIPTION

Systems and methods are provided to facilitate efficient generation and creation of visualizations. In one aspect, a visualization development system is provided. The system includes a visualization tool to develop one or more visualizations and a grammar engine that operates with the visualization tool to automatically detect visualization problems during the development of the visualizations. The development of the visualizations includes design, layout, creation, simulation, animation, views, and production of the visualizations, for example. A feedback component automatically generates grammar suggestions to a user or integrates feedback with the visualizations.

As used in this application, the terms "component," "tool," "engine," "visualization," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
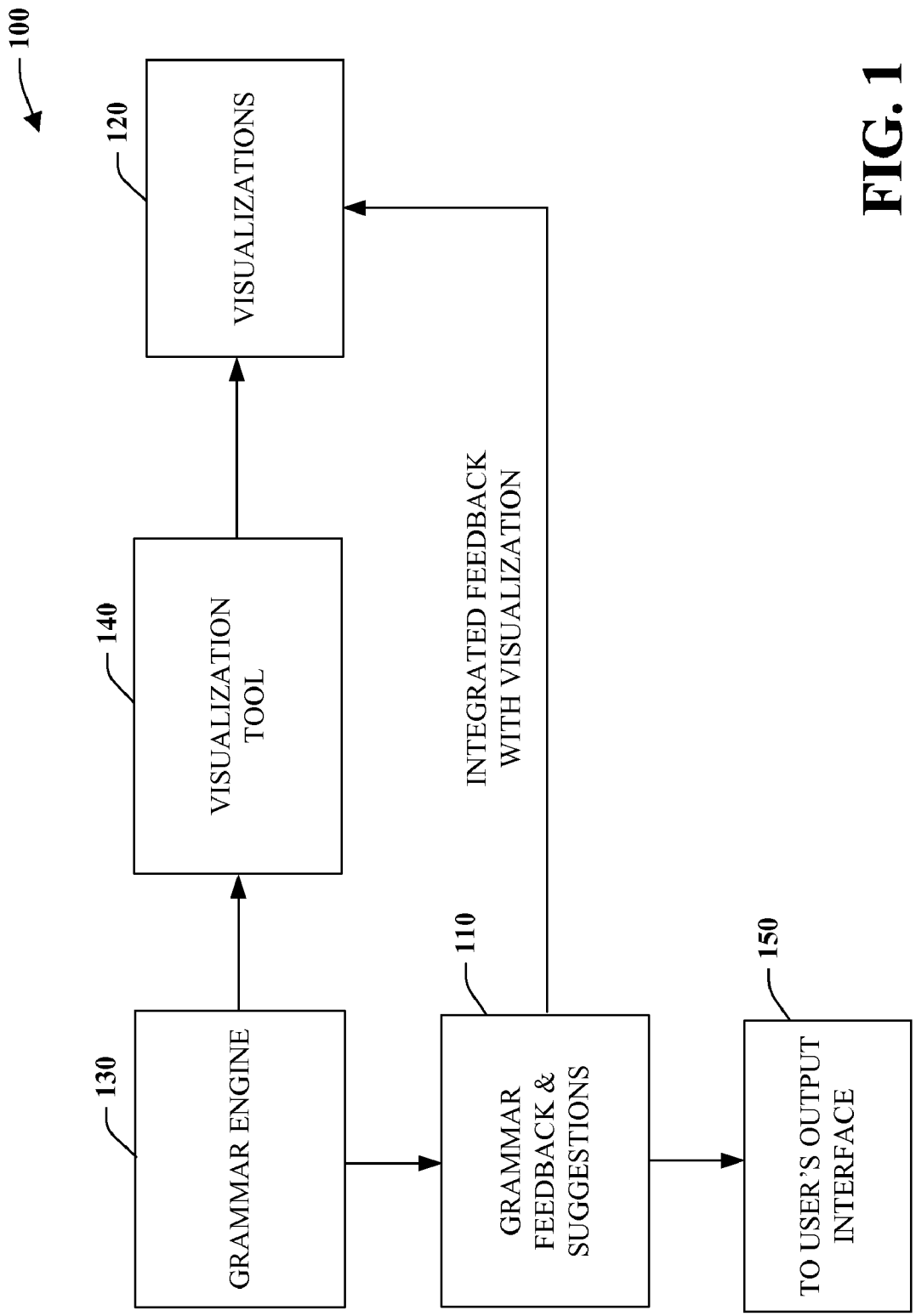
FIG. 1 is a schematic block diagram illustrating a visualization grammar system for generating visualizations.

Referring initially to FIG. 1, a visualization grammar system 100 is illustrated for generating and designing visualizations. The visualization grammar system 100 facilitates visualization development in real time and provides feedback 110 to designers to enable accurate and efficient development of one or more visualizations 120. A grammar engine 130 operates in conjunction with a visualization development tool 140, where such tool can be employed to design, develop, layout, create, simulate, animate, view, and produce the visualizations 120. The visualization tool 140 can be applied to substantially any area of visualization development including scientific visualizations, technical visualizations, information visualizations, knowledge visualizations, education visualizations, product visualizations, along with visual communications, and visual analytics, for example. The grammar engine 130 operates in the background (or foreground) and monitors development as respective visualizations 120 (and associated data) are being designed, viewed, or manipulated. Intelligent or other processes can interact with the designer to make suggestions for enhancements to the visualizations 120 via feedback 110.

In another aspect, the grammar engine 130 acts as a grammar checker for the visualizations 120 where potential defects in a visualization design are called to the attention of the designer. For example, it might be pointed out in a feedback window or output 150 that an axis laid-out for a particular visualization has potentially promoted a conflict in another area of the visualization. Grammar can include checking the structure and form of visualization commands as well as checking or analyzing the actual output of the visualization for potential errors or warnings. Feedback including grammar checking and automated suggestions can be generated in a separate process output 150 from the visualization or can be integrated with the visualization itself at 120.

In one aspect, the grammar engine 130 (or checker) for visualizations 120 provides a set of rules that are well known for how to interact/design visualizations, e.g., a bar chart where the origin is not zero and some notification is generated as feedback 110 that the visualization may not be appropriate, warn users, and so forth. This includes determining substantially all the activities that work well or do not work well with the visualization 120 and allow the grammar engine 130 to generate flags or other feedback 110 on what the user has constructed or simulated. The grammar engine 130 can determine common mistakes and inform users when design processes do not make sense based on heuristics, rules, or other constructs (e.g., classifiers that are trained from previous users of the system). Intermediate results can also be generated as flags, warnings, or errors, where a completed visualization 120 does not have to be generated before such warnings or errors are generated to notify the user at 110 of potential command, data, or other construct issue.

In another aspect, the grammar engine 130 promotes or locates common patterns for interactions with visualizations. This includes interactivity for visualizations, including how do users tie a set of reactions/actions to a visualization, is the visualization process something that can be queried, what are the drag or other input/mouse actions, what are the valid actions users can perform on that data, how do users change the values of the data, bars, mouse, policies, and how the visualization application determines a valid action, and so forth. This also includes determining what is valid for gestures that can be pushed down into a simulation and providing feedback 110 on how users place data into the system and then how do they determine what is valid data.

The grammar engine 130 can also provide a set of possible actions or interactivity mechanisms one can use with a given data set or determine what is appropriate for the visualization 120. The actions can be directed into the context of the data. For example in a manufacturing setting, instructions to call a supplier, provide metadata within data that users are analyzing to determine patterns that the data may be tied to, generate visualizations based on manufacturing schedules, where yellow bars are demand and blue bars are supply. Thus, move supply in different locations, where one does not have to round-trip constantly back to a database but allows interacting in the visualization 120 itself to process potential views based on a given data manipulation. Also provide the users immediate feedback 110 if placing some visual item is at a suitable location on the display and so forth.

In yet another aspect, a control language for visualizations can be provided via the visualization tool 140 or the grammar engine 130. This includes providing controls for visualizations 120, separating the control language from event mechanisms for hosting business logic, and proceeding back to the hosting application to query valid data ranges, and so forth. The language can allow for discovering other services in a cloud and integrating into the respective controls. For instance, right clicking on a bar and discovering other possible services that may be available for data or the visualization 120. The grammar engine 130 can also provide automated suggestions to help locate related data e.g., suggestion to use a public data source somewhere and pull that into a spreadsheet, history of voting records, and so forth. In yet another aspect, when users are satisfied with a particular visualization result, the visualization tool 140 or the grammar engine 130 can provide commands to execute simulation runs for desired visualizations or display alternative visualizations 120 that may also be desirable in view of the current visualization. In another aspect, a visualization system 100 is provided. The system includes means for generating a visualization (e.g., visualization tool 140) and means for checking input associated with generating the visualization (e.g., grammar engine 130). The system also includes means for receiving feedback (e.g., output 150 or 160) relating to errors or warnings associated with the visualization.

Figure 2:
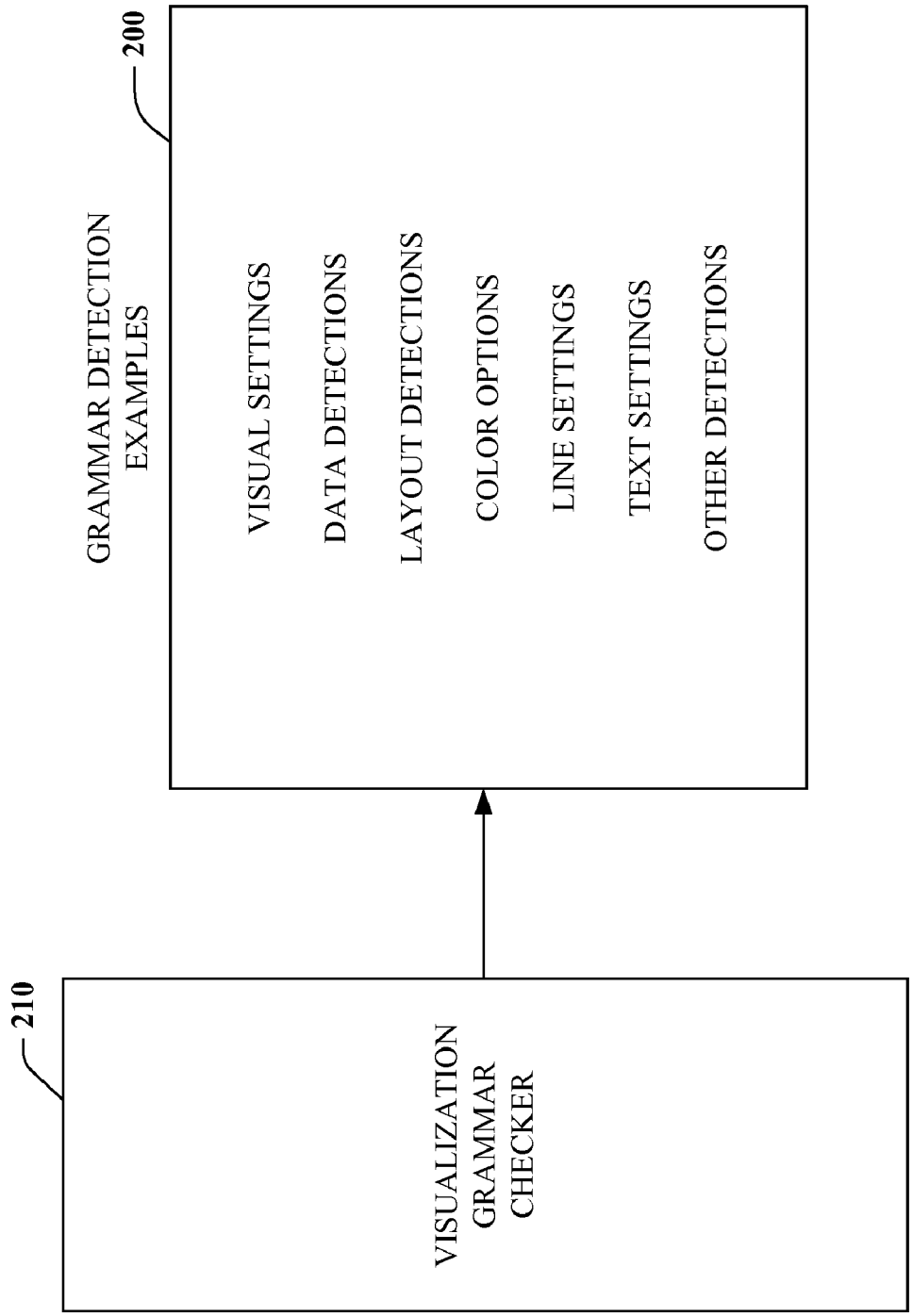
FIG. 2 is a block diagram that illustrates various grammar detection examples.

Referring now to FIG. 2, grammar detection examples 200 are illustrated that can be employed with a visualization grammar checker 210. The detections examples 200 include detecting whether or not overall plot settings such as font size, thickness of characters, and the style of images in a given visualization are suitable for the framework selected. This can include detecting axis settings such that every axis can be customized independently and located in a given view. Data detections and options include analyzing labels, character sizes, scale ranges, markings or distances, line or shape lengths including direction such as inwards, outwards and so forth, color bar scales, and so forth. An interface can also provided for data adjustments if an error is detected or for the user to select one or more alternative options. Other detections 200 include layouts, shape locations and spacing between shapes or lines that a user can specify including user-specified color bars, for example.

Vertical, horizontal, or other orientation lines/shapes can be analyzed for fitness to a proposed data set or suitability for a proposed visualization. This includes analyzing proposed views in one or more dimensions such as if visualizations are animated and transitions from one view to another. Other detections examples where rules or heuristics can be applied include analyzing iso-surfaces volume renderings. This can include generating warnings when a command or other user action is inconsistent with the tool's capabilities or providing alternative suggestions to a proposed visualization plan. Other detections 200 where rules can be applied include streamlines, streak-lines, and path-lines for example. The grammar checker 210 can analyze tables, matrixes, charts (e.g., pie chart, bar chart, histogram, function graph, scatter plot, and so forth) and graphs (e.g., tree diagram, network diagram, flowchart, existential graph, and so forth). Other types of grammar analysis can be applied to parallel coordinates—a visualization technique aimed at multidimensional data, tree-map—a visualization technique for hierarchical data, Venn diagrams, Euler diagrams, Chernoff faces, Hyperbolic trees, and so forth. Substantially any type of drawing action or command input that can be generated by a user can be analyzed for potential errors by the grammar checker 210, where along with detecting errors potential alternative visualization options can also be presented.

It is noted that the grammar checker 210 can operate in various modes. For instance, one mode may be monitoring a user's actions or commands and flagging or warning command/input errors as they are detected within a design tool environment. In yet another mode, the grammar checker 210 can provide alternative visualization options based upon detected actions of a user such as presenting alternative visualization forms, data manipulation options, and other suggestions based on stored capabilities or learned patterns. The grammar checker 210 can employ heuristics, rules, or comparative techniques to detect potential visualization problems or determine suggestion options. This can include interactions with a visualization compiler that processes visualization commands to determine if the user has instructed or commanded the visualization tool in a suitable manner consistent with previous rules, heuristics, or learned patterns.

Patterns can be learned from a group of users and rules gleaned from past user mistakes. This can also include monitoring a single user over time to learn common patterns of commands or other inputs that may generate errors with a visualization tool. An inference component (not shown) can be employed to identify suitable steps, or methodologies to accomplish the determination of a particular grammar rule or procedure (e.g., observing a data pattern and determining a suitable visualization). Classifiers or other learning components can be trained from past observations where such training can be applied to a visualization input directed to a design tool. From current received input, future predictions regarding the nature, shape, or pattern can be predicted. Such predictions can be used to provide one or more visualization options as previously described or generate a potential error if detected. The classifiers or other artificial intelligence-based aspects can be affected via any suitable machine learning based technique or statistical-based techniques or probabilistic-based techniques or fuzzy logic techniques. Specifically, learning models can be employed based upon AI processes (e.g., confidence, inference). For example, a model can be generated via an automatic classifier system.

Figure 3:
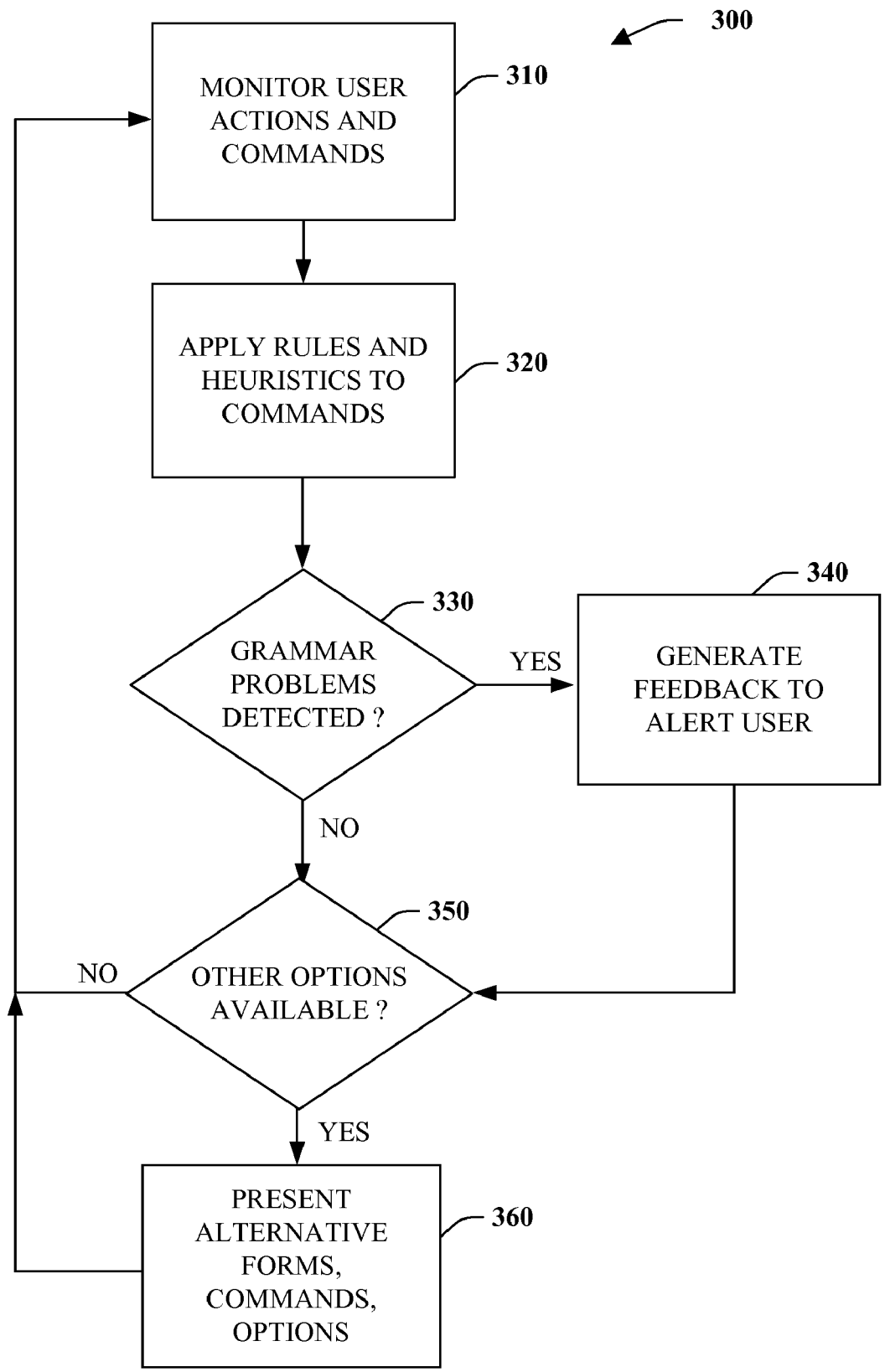
FIG. 3 is a flow diagram that illustrates a visualization grammar checking process.

Referring now to FIG. 3, a visualization grammar checking process 300 is illustrated. While, for purposes of simplicity of explanation, the process is shown and described as a series or number of acts, it is to be understood and appreciated that the subject process is not limited by the order of acts, as some acts may, in accordance with the subject processes, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject processes described herein.

Turning to FIG. 3, an example process 300 is illustrated that performs automated grammar checking for visualizations. Proceeding to 310, a user's actions are monitored as they utilize a visualization tool to design or generate a respective visualization form or forms. The visualization forms can be substantially any display or output type including graphs, charts, trees, multi-dimensional depictions, video/audio displays describing data, hybrid presentations where output is segmented into multiple display areas having different data analysis in each area and so forth. User actions include visualization command inputs or graphical gestures directed at the visualization tool where a grammar checker can be applied to analyze such actions. At 320, rules or heuristics are applied to the user commands that were monitored at 310. This can include comparative grammar analysis to ensure that commands have been entered correctly. More sophisticated analysis can include analyzing patterns and fits to proposed areas of a visualization or output. For instance, does a user's current rendering of data conform to stored logical parameters for presentation of the respective data.

Proceeding to 330, a determination is made as to whether or not grammar problems have been detected with the monitored actions and in view of the rules or heuristics. If one or more potential problems have been detected at 330, the process generates an error message or warning to the user at 340 before proceeding to 350. Such error or warning can be included/integrated as output in the actual visualization itself if desired. If no errors or potential warnings are detected at 330, the process proceeds to 350, where a determination is made as to whether or not other visualization options are available. Such decisions can be made from stored user actions that are detected in context of current user actions. These decisions can also be gleaned from user databases via data mining or other learning activities. If other visualization options are available at 350, the process presents alternative commands, visualization forms, drawing suggestions, or other options at 350 before proceeding back to 310 to monitor further user activities.

If other options are not available in view of present user directives at 350, the process proceeds back to 310 to monitor other user actions. It is noted that alternative visualization options can be presented (e.g., form or shape proposed in view of another form or shape, or data processing or other presentation options presented, suggest table for this portion of visualization and three-dimensional graph for another portion of visualization). Alternative tool commands and data processing options can also be provided.

Figure 4:
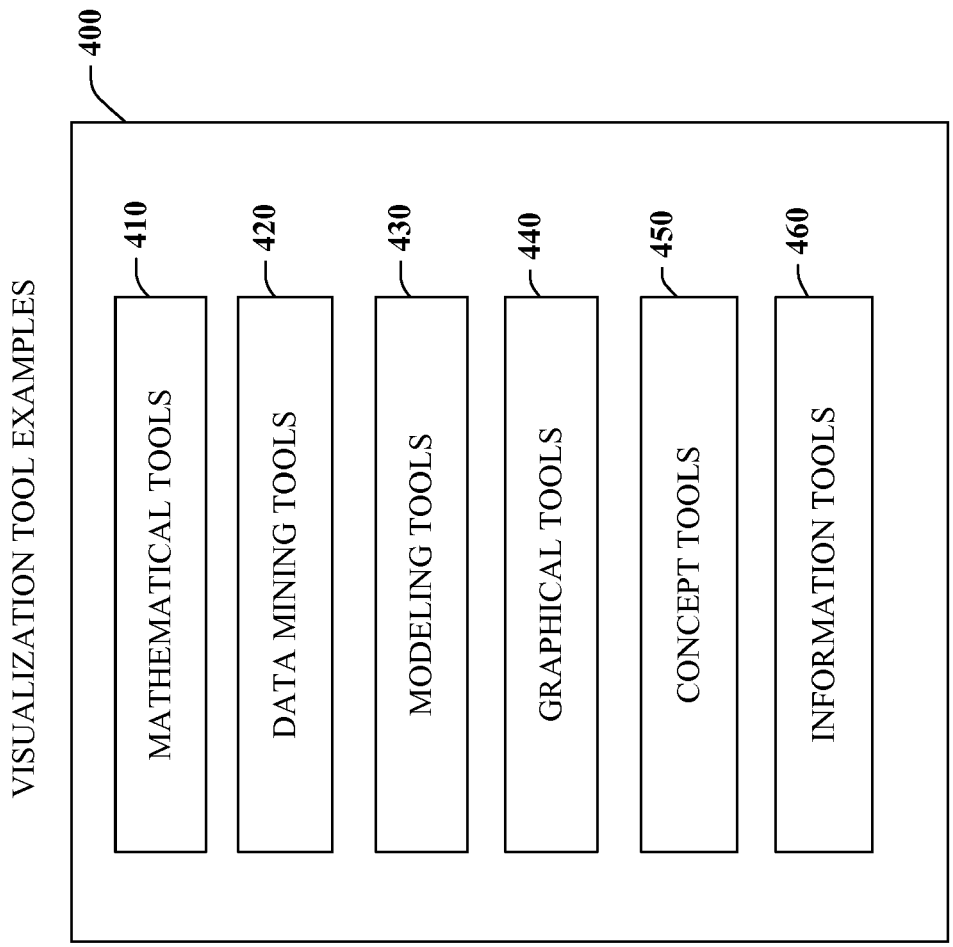
FIG. 4 illustrates visualization tool examples.

Referring now to FIG. 4, visualization tool examples 400 are illustrated, where the visualization tools can be employed with the grammar checking components described above. It is to be appreciated that only a few possible tool examples 400 are described for illustrative purposes yet visualization grammar checking can be applied to substantially any type of visualization system. In one example, visualization tools can include mathematical tools 410. This can include statistical tools to summarize or describe a collection of data including descriptive statistics. In addition, patterns in data may be modeled in a manner that accounts for randomness and uncertainty in the observations, and then used to draw inferences about the process or population being studied which is referred to as inferential statistics. Both descriptive and inferential statistics comprise applied statistics. There is also a discipline called mathematical statistics, which is concerned with the theoretical basis of the subject. Thus, any tool that models mathematical data in a visual form can be employed with the grammar checking rules described above.

In another tools example, data mining tools 420 can be employed to visualize data. Data mining is the process of sorting through large amounts of data and selecting relevant information. It is usually used by business intelligence organizations, and financial analysts, but is increasingly being used in the sciences to extract information from the large data sets generated by modern experimental and observational methods. In another tool example, various modeling tools 430 can be employed to visualize data. This can include scientific modeling which is the process of generating abstract, conceptual, graphical and or mathematical models. Science offers a collection of methods, techniques and theory about all types of specialized scientific modeling.

Other types of tools 400 include graphical tools 430. Graphs are often represented pictorially using dots to represent vertices, and arcs to represent the edges between connected vertices. Arrows can be used to show the orientation of directed edges. Note that this graphical representation (a graph layout or an embedding) should not be confused with the graph itself (the abstract, non-graphical structure). Thus, different layouts can correspond to the same graph. In the abstract, all that matters is which vertices are connected to which others by how many edges. In the concrete, however, the arrangement of these vertices and edges impacts understandability, usability, fabrication cost, and aesthetics. These types of decisions can be run through the grammar engine to determine whether or not graphs have been described in a suitable manner with respect to the capabilities of the tool.

Rules can be applied to: force-based layouts including gradient-descent minimization of an energy function based on physical metaphors related to molecular mechanics; spectral layout: layout using as coordinates the eigenvectors of a matrix such as the Laplacian derived from the adjacency matrix of the graph; orthogonal layout: layout with edges running horizontally or vertically, with approaches that reduce the number of edge crossovers and area covered; symmetric layout: these attempt to find symmetry groups within the graph; tree layout: these show a rooted tree-like formation, suitable for trees (e.g., graphs without cycles); and hierarchical layouts: these attempt to find a source and sink within a directed graph and arrange the nodes in layers with most edges starting from the source and flowing in the direction of the sink.

In yet another tool example 400, one or more concept tools 450 can be provided. For instance, these types of tools 400 may help visualize a conceptual graph that is a notation for logic based on semantic networks of artificial intelligence. This may also include concept mapping for visualizing the relationships among different concepts, where a concept map is a diagram showing the relationships among concepts. Concepts can be connected with labeled arrows, in a downward-branching hierarchical structure. In yet another tools example 400, information tools 460 can be employed with a grammar checking engine. Information graphics are visual representations of information, data or knowledge. These graphics are used anywhere where information needs to be explained quickly or simply, such as in signs, maps, journalism, technical writing, education, and so forth. They are also used extensively as tools by computer scientists, mathematicians, and statisticians to ease the process of developing and communicating conceptual information. They are applied in most aspects of scientific visualization.

Figure 5:
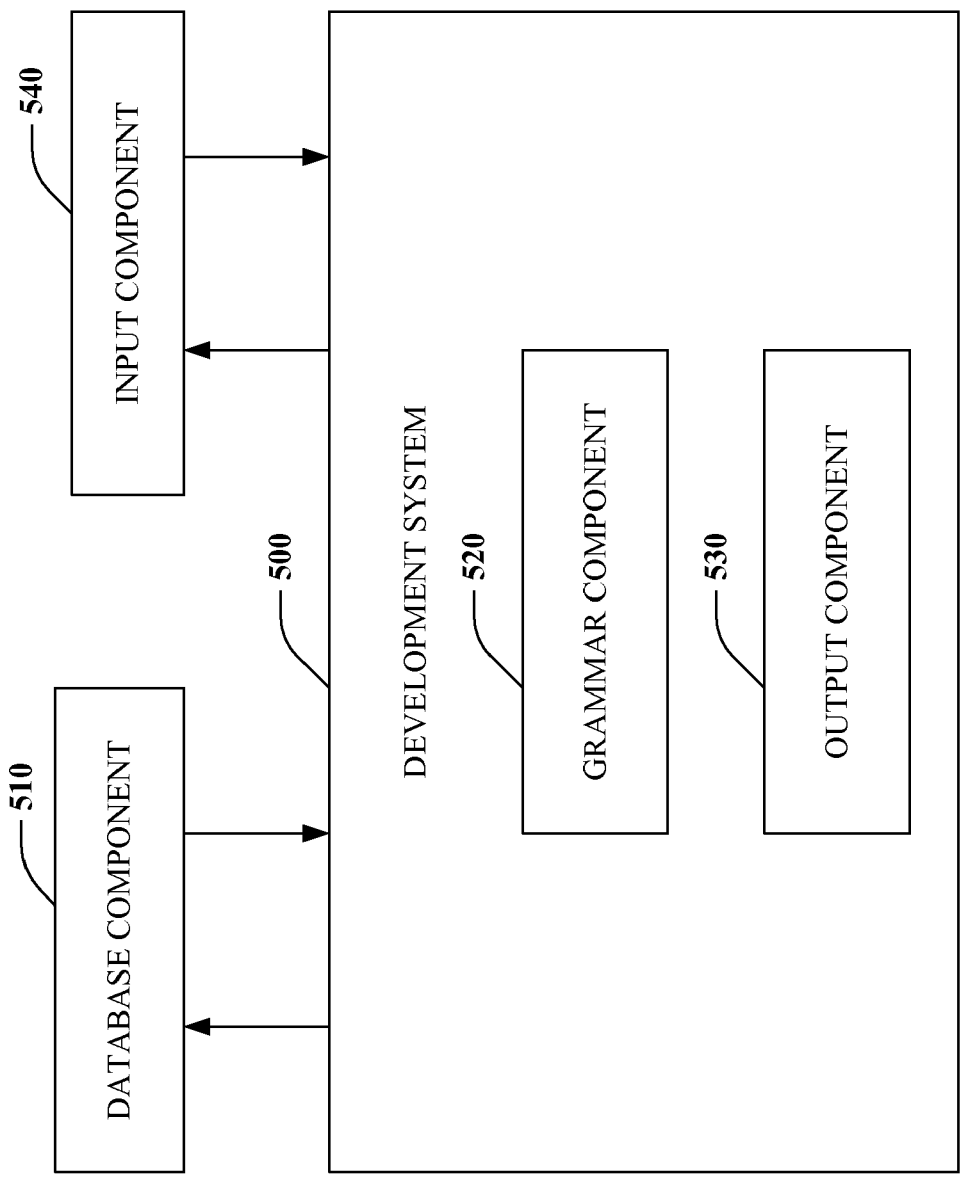
FIG. 5 illustrates an exemplary development system for visualizations.

Referring to FIG. 5, an exemplary development system 500 for visualizations. The system 500 includes a database component 510 for storing visualization designs and other data such as rules or heuristics that may be employed by a grammar component 520. An output component 530 is provided for viewing visualizations and receiving feedback from the grammar component 520. An input component 540 allows for visualization commands and other input to the system 500. This can include typed, spoken, facial, or gesture-based commands.

Generally, the system 500 provides an integrated development environment (IDE) which is a software application that provides comprehensive facilities to computer programmers for development. In this case, the system 500 provides for development of visualizations with the grammar component 520 monitoring such development for errors or suggestions.

An IDE normally consists of a source code editor, a compiler and/or interpreter, build automation tools, and (usually) a debugger. Sometimes a version control system and various tools are integrated to simplify the construction of a graphical user interface (GUI). Many modern IDEs also have a class browser, an object inspector, and a class hierarchy diagram, for use with object oriented visualization development.

Typically, IDEs are designed to maximize programmer productivity by providing tightly-knit components with similar user interfaces. This should mean that the programmer has much less mode switching to do than when using discrete development programs. The IDE is generally dedicated to a specific programming language, so as to provide a feature set which most closely matches the programming paradigms of the language however that is not a requirement. Also, IDEs typically present a single program in which all development is achieved. This program typically provides many features for authoring, modifying, compiling, deploying and debugging visualizations. The goal is to abstract the configuration necessary to piece together command line utilities in a cohesive unit, which theoretically reduces the time to learn a language, and increases developer productivity. It is also thought that the tight integration of development tasks can further increase productivity. For example, code can be compiled while being written, providing feedback on syntax errors via the grammar component 520.

It is noted that an interface (not shown) can be provided to facilitate modeling data and designing visualizations based off the data. This can include a Graphical User Interface (GUI) to interact with the user or other components such as any type of application that sends, retrieves, processes, and/or manipulates data, receives, displays, formats, and/or communicates data, and/or facilitates operation of the system. For example, such interfaces can also be associated with an engine, server, client, editor tool or web browser although other type applications can be utilized.

The GUI can include a display having one or more display objects (not shown) for manipulating electronic sequences including such aspects as configurable icons, buttons, sliders, input boxes, selection options, menus, tabs and so forth having multiple configurable dimensions, shapes, colors, text, data and sounds to facilitate operations with the profile and/or the device. In addition, the GUI can also include a plurality of other inputs or controls for adjusting, manipulating, and configuring one or more aspects. This can include receiving user commands from a mouse, keyboard, speech input, web site, remote web service and/or other device such as a camera or video input to affect or modify operations of the GUI.

Figure 6:
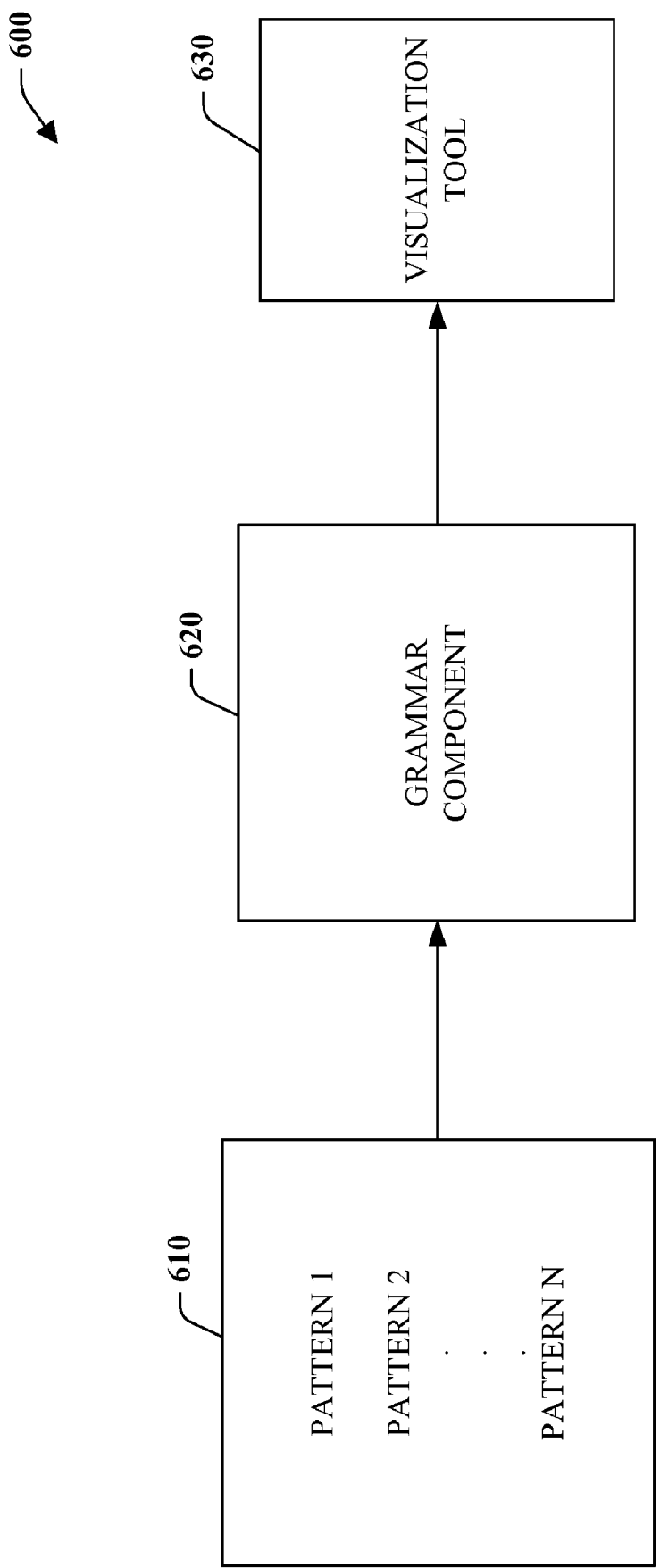
FIG. 6 illustrates a system that employs common patterns for visualizations.

Referring now to FIG. 6, a system 600 illustrates employing common patterns for visualizations. In this aspect, one or more common visualization patterns 610 can be stored, where such patterns can be presented to a user via a grammar component 620 and/or visualization tool 630. The patterns 610 can be employed to assist visualization development. For instance, as noted previously, the patterns can be employed to alert users to visualization options such as what are the drag actions, what are the valid actions users can perform on that data, how do users change the values of data, alerting how an application determines what a valid action is, and so forth. This includes what are the valid gestures for a simulation, how users get data into system, and how do they determine valid data. The patterns 610 can provide a set of possible actions or interactivity mechanisms or what is appropriate for a respective visualization.

Figure 7:
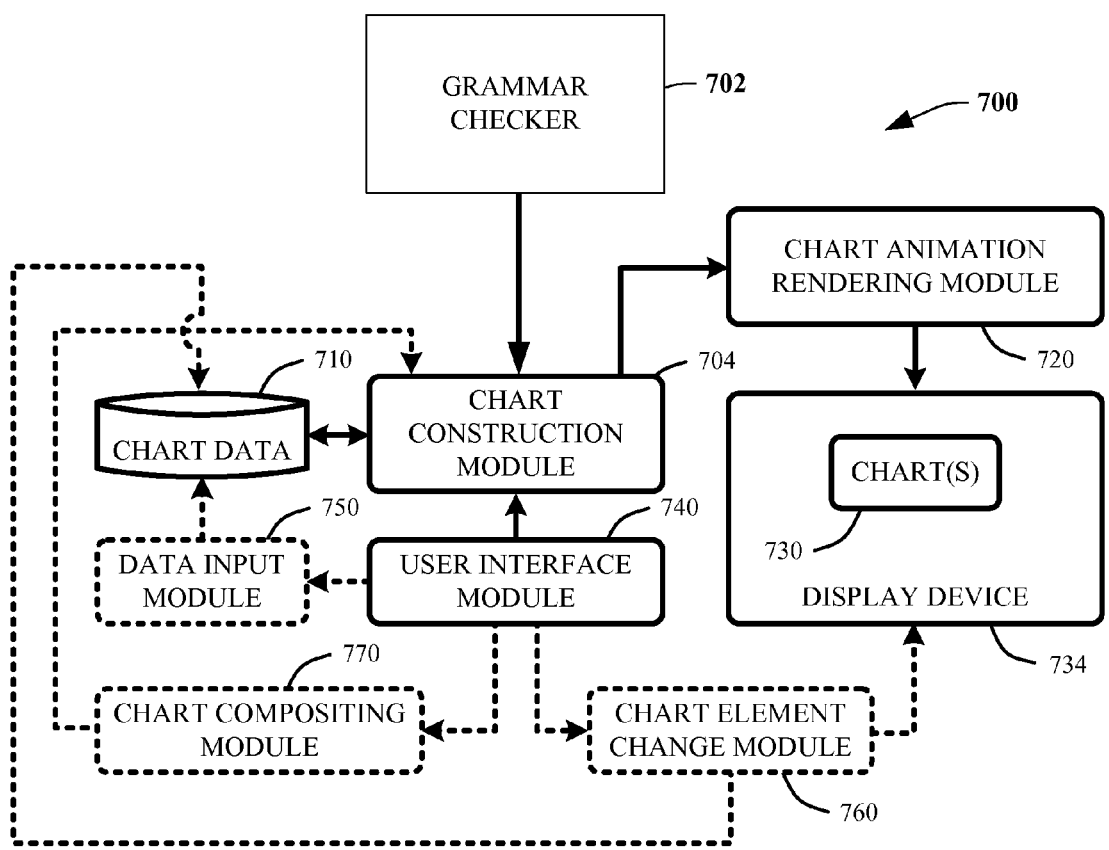
FIG. 7 illustrates an example system for transitioning or morphing between dynamic display visualizations.

Referring to FIG. 7, an example system 700 is illustrated for transitioning or morphing between dynamic display visualizations. As shown, a grammar checker 702 is associated with a chart construction module 704. In general, a Charting Animator process generally begins operation by using the chart construction module 704 to define parameters used to construct one or more charts (e.g., Pie Charts, Bar Charts, Line Charts, Area Charts, Plateau Charts, etc.) using one or more sets of chart data 710. The chart construction module 704 then provides these parameters to a chart animation rendering module 720 which renders chart(s) 730 on a display device 734 (or surface). In each of the following examples associated with FIG. 7 that utilize chart construction module 704, grammar checker 702 is consulted to verify that the newly constructed chart passes all of the grammar checks, and uses grammar checker 702 to correct any problems that are detected.

When the chart(s) 730 have been rendered on the display device 734, changes to the rendered chart(s) are enabled using any of several aspects. For example, in one aspect, a user interface module 740 is utilized to modify one or more of data elements comprising the chart data 710 via a data input module 750. Modifications to these data elements include changing the value of one or more of the data elements, adding one or more data elements, and deleting one or more data elements. In general, these data elements are maintained in a conventional computer readable format, such as, for example, in a list, table, database, and so forth. Consequently, direct modifications to the data elements by using a user interface to change the data elements via the data input module 750 can be accomplished using conventional techniques.

When data elements have been modified, the chart construction module 704 determines new chart parameters corresponding to the modified data elements, and passes those chart parameters to the chart animation rendering module 720. At this point, the chart animation rendering module 720 then morphs the existing charts(s) 730 into new chart(s) 730 using a dynamic animation that smoothly transitions from the existing chart(s) to the new chart(s) on the display device 734.

In another aspect, changes to the rendered chart(s) 730 are enabled by directly modifying one or more elements of the chart(s), such as, for example, resizing the height of one or more bars on a Bar Chart, or changing the size of a pie slice in a Pie Chart. In various aspects, direct modification of the elements of the chart(s) is accomplished via the user interface module 740 which allows the user to select one or more individual elements of one or more charts 730 using a graphical user interface provided via a chart element change module 760. This graphical user interface provides a graphical interface to chart(s) 730 being rendered on the display device 734 for resizing, moving, sorting, or deleting one or more of those chart elements. Similarly, chart elements can also be added to one or more of the chart(s) 730 via the graphical user interface provided by the chart element change module 760.

When any chart elements have been modified (by resizing, moving, sorting, deleting, adding, etc.), the chart element change module 760 then automatically modifies the corresponding data elements of the chart data 710 (or adds new values to the chart data) to fit changes made to the chart elements. For example, if a bar in a Bar Chart originally had a value of "10," then that bar was resized via the chart element change module 760 to show a value of "5" on the display device 734, then the chart element change module can change the value of the corresponding data element to "5" in the chart data 710.

Depending upon the chart(s) being displayed, many of the chart elements are often interdependent. Consequently, changes to one data element (either via the data input module 750, or via the chart element change module 760) used to construct the chart will often have an effect either on other data values, or on the displayed chart(s) 730. For example, if a pie slice in a Pie Chart is deleted or resized, or the underlying data value is changed, the other slices in the Pie Chart can be resized so that the Pie Chart retains a full pie shape. Therefore, when a change to data elements of the chart data 710 occurs (by any mechanism described herein), the chart construction module 704 determines new chart parameters corresponding to the modified data elements, and passes those chart parameters to the chart animation rendering module 720. At this point, the chart animation rendering module 720 then morphs the existing charts(s) 730 into new chart(s) 730 utilizing a dynamic animation that smoothly transitions from the existing chart(s) to the new chart(s) on the display device 734

In yet another aspect, a chart compositing module 770 is accessed via the user interface module 740 for creating a composite chart from two or more existing charts 730. In general, the user can use the chart compositing module 770 to specify (or select from a predefined list) some mathematical relationship between two or more existing charts 730. This mathematical relationship is then used to construct a composite chart by passing composite chart parameters to the chart construction module which in turn passes those parameters to the chart animation rendering module which acts to render the composite chart on the display device as an animation that morphs the existing charts into the composite chart.

Figure 8:
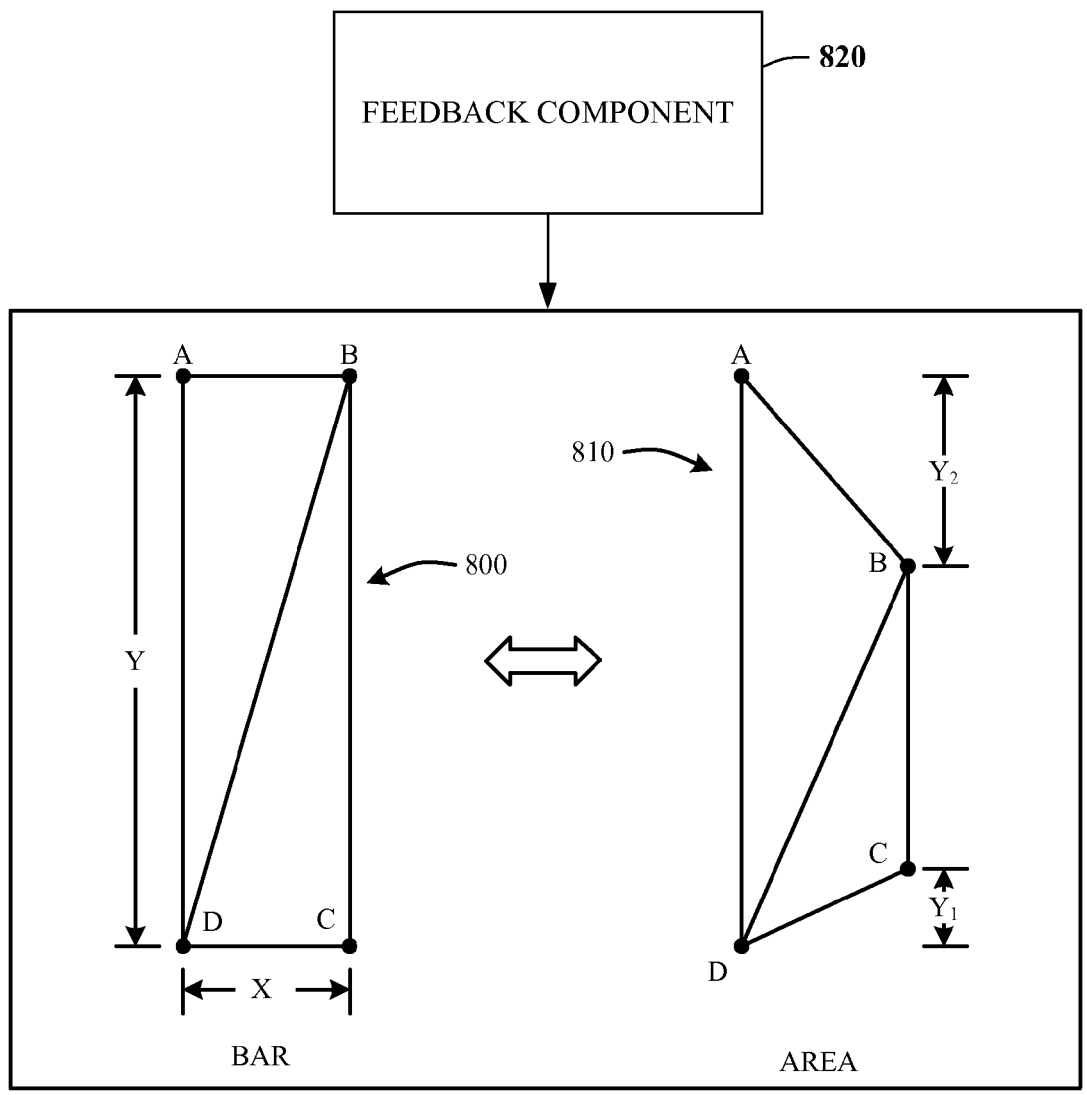
FIG. 8 illustrates an example visualization transition.

Referring to FIG. 8, an example visualization transition is illustrated. In general, the system 700 previously described has the ability to morph chart elements of one shape into chart elements of another shape, such as, for example, morphing to or from a rectangle to a line segment, area segment, or pie slice. This morphing is generally achieved by moving existing points of the various chart elements to create the new shapes, then rendering intermediate shapes to create the animated transition. Further, in addition to moving points to define a new shape, various animation components introduce new points as needed. For example, a pie slice employs many more points than a rectangular bar of a Bar Chart; so, when transitioning from a bar to a pie slice, more points are added—and when transitioning away from a pie slice, those extra points are removed.

Changing the shape of chart elements from one shape to another, such as, for example, changing a rectangular bar of a Bar Chart to a polygon of an Area Chart, or changing a rectangular bar of a Bar Chart to a pie slice of a Pie Chart is achieved by smoothly morphing the chart element from the original shape to the new shape to provide an animated transition between the shapes. This morphing can be accomplished using any of a number of morphing techniques.

For example, in one aspect, as illustrated by FIG. 8, a rectangular bar of a Bar Chart is morphed into a polygon of an Area Chart. Note that this example is not intended to limit the way in which shapes are morphed, and is provided only as a simple illustration of shape morphing techniques that may be utilized by the various animation techniques described or inferred herein.

A rectangle 800 defined by corner points {A, B, C, D} is changed to polygon 810 by translating point B by offset Y2, and translating point C by offset Y2. Clearly, any of the four points of rectangle 800 can be translated in either the X or Y direction to provide the desired shape. Similarly, translating some or all of the points, depending upon the shape, is used for scaling the shape. For example, translating two or more of points A, B and C towards (or away from) point D can be used to scale the size of rectangle 800 either up or down. Further, any one of the four points of rectangle 800 can be collapsed into another of those points to create a triangle from the rectangle 800. In any case, once the points of the new shape have been determined, the animation from the original shape to the new shape is created by simply rendering a sequence of intermediate images in steps as small as one pixel for each point, over some period of time. As can be appreciated, a plurality of various shapes, forms, and associated dimensions can be morphed or transitioned from one shape or form to another. Also, a feedback component 820 is shown that can provide errors, warnings, or suggestions during the visualization based off of detected visualization grammar or rules as described above.

Figure 9:
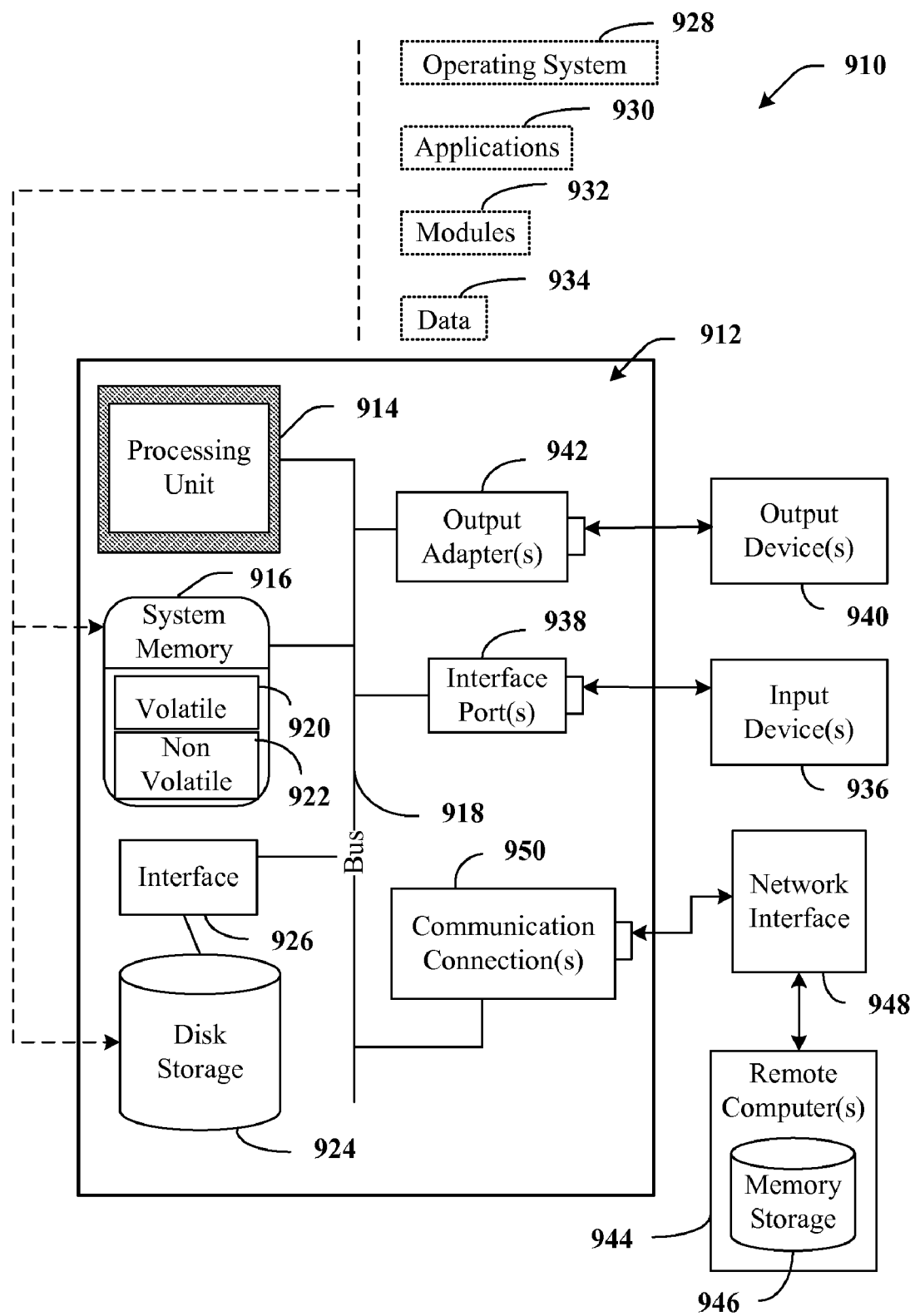
FIG. 9 is a schematic block diagram illustrating a suitable operating environment.
Figure 10:
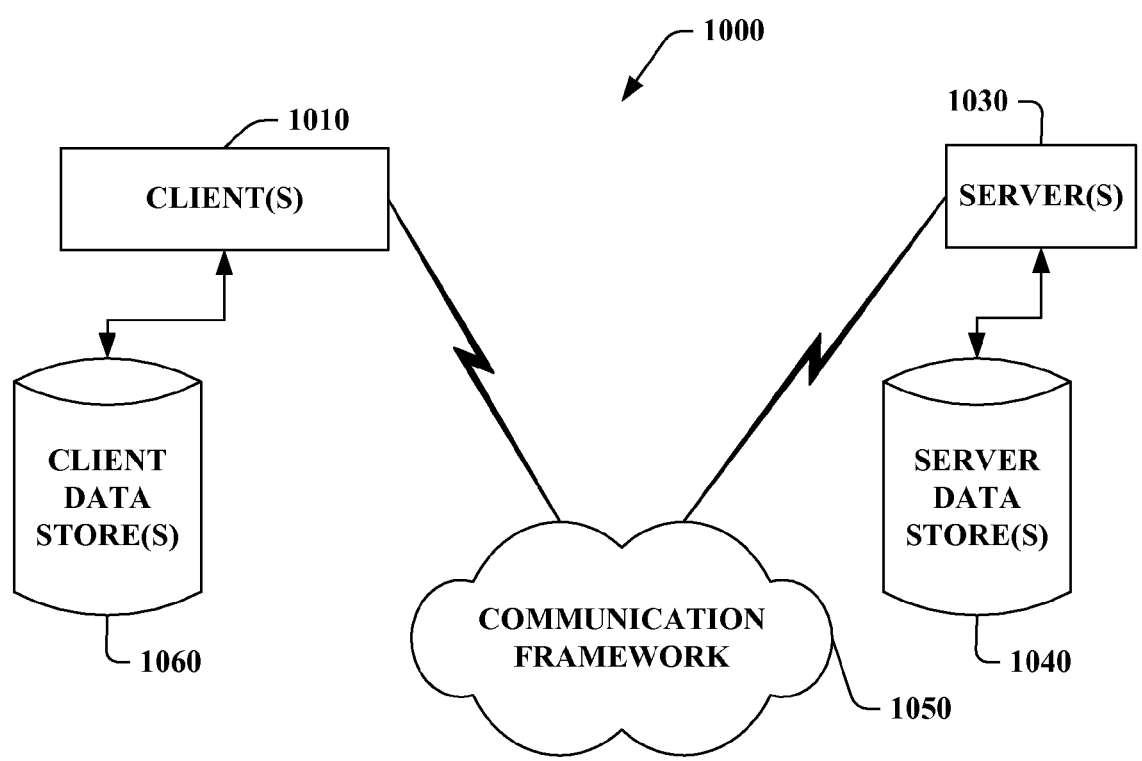
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couple system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 64-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 928 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912 and to output information from computer 912 to an output device 940. Output adapter 942 is provided to illustrate that there are some output devices 940 like monitors, speakers, and printers, among other output devices 940 that require special adapters. The output adapters 942 include, by way of illustration and not limitation, video and sound cards that provide a means of connection between the output device 940 and the system bus 928. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944.

Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 702.3, Token Ring/IEEE 702.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/ software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/ or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030. It is noted that some of the computation may be performed on either side of a network, with a thin visualization being local. Similarly, mobile devices such as a cell phone can be applicable for visualizations since there is only so much screen size, and thus making a decision about what to show is relevant.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
   at least one processing unit;
   a memory having instructions therein and readable by the at least one processing unit, the instructions and the at least one processing unit comprise a visualization developer, when the at least one processing unit executes the instructions, the visualization developer comprising:
a visualization tool that outputs one or more visualization forms based at least in part on user commands for the visualization tool, the user commands having at least one of a structure and a form; and
a visualization grammar engine that operates with the visualization tool to automatically check at least one of the structure and the form of the user commands to detect visualization problems in at least one outputted visualization form.

2. The system of claim 1, the development of the visualization forms includes design, layout, creation, simulation, animation, views, and production of the visualization forms.

3. The system of claim 1, further comprising a feedback component to generate grammar suggestions to a user or integrate feedback with the visualization forms.

4. The system of claim 1, the visualization tool includes a mathematical component, a data mining component, a modeling component, a graphical component, a concept component, or an information component.

5. The system of claim 1, the grammar engine analyzes visual settings of information displayable in the visualization forms, data options, layout options, color options, line settings, shape configurations, text options, coordinates, trees, maps, charts, or tables.

6. The system of claim 1, the grammar engine employs rules or heuristics to analyze user commands, actions, or gestures when designing or manipulating the visualization forms.

7. The system of claim 6, the grammar engine is fed from a data mining component or a learning component to enhance the rules or heuristics.

8. The system of claim 1, the grammar engine generates errors or warnings when detecting problems with a visualization form or visualization input to the visualization tool, the visualization input being separate from the user commands.

9. The system of claim 1, wherein a first visualization form of the one or more visualization forms includes first data, and further comprising a component to generate automated suggestions on how to locate second data related first data for at least one visualization form of the one or more visualization forms.

10. The system of claim 1, further comprising a simulation component that can receive feedback from the grammar engine.

11. The system of claim 1, further comprising a component to store one or more visualization patterns.

12. The system of claim 11, the one or more visualization patterns are associated with valid user actions.

13. The system of claim 11, the one or more visualization patterns are associated with changing the values of data.

14. The system of claim 11, the visualization patterns are associated with a work-flow process.

15. The system of claim 1, the grammar engine includes a control language for a generating a visualization.

16. A visualization development method, comprising:
monitoring on a computing device a plurality of user commands that control a visualization tool that outputs one or more visualization forms;
applying rules or heuristics to the user commands;
determining with a computing device if the user commands conform to the rules or heuristics;
outputting one or more visualization forms from the visualization tool based at least on the user commands;
generating feedback to a user if the user commands do not conform to the rules or heuristics based at least on the output visualization forms; and
generating one or more visualization options after applying the rules or heuristics.

17. The method of claim 16, further comprising generating one or more options for locating data related to the content of the visualization forms.

18. The method of claim 16, further comprising simulating the visualization forms in accordance with the feedback.

19. The method of claim 16, further comprising integrating the feedback with the visualization forms.

20. A visualization system, comprising:
means for generating a visualization form, the visualization form being at least one of a graph, a chart, a tree, a multi-dimensional depiction, or a hybrid presentation segmented into multiple display areas having different data analysis in each area;
means for checking input commands associated with generating the visualization; and
means for receiving feedback relating to errors or warnings associated with the visualization.

* * * * *